Patented Dec. 5, 1950

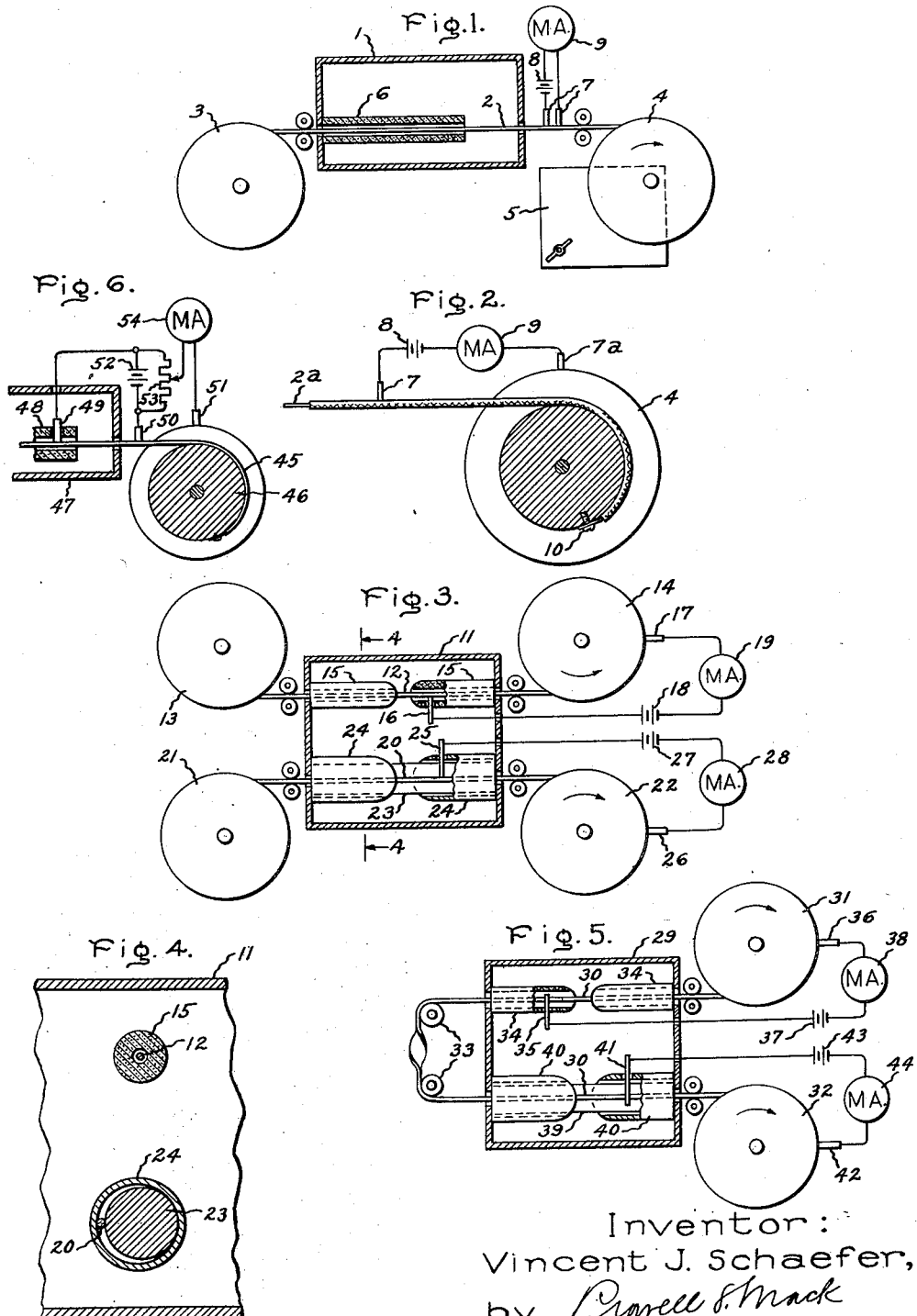

2,532,822

UNITED STATES PATENT OFFICE 2,532,822

ELECTRICAL MOISTURE METER

Vincent J. Schaefer, Schenectady, N. Y., assignor to General Electric Company, a corporation of New York Application November 18, 1947, Serial No. 786,603

16 Claims. (Cl. 73—335)

1

My invention relates to improved apparatus for continuously measuring the amount of suspended liquid in an aerosol, and more particularly to improved apparatus for measuring the liquid water content of clouds.

It is an object of my invention to provide improved apparatus to measure the liquid content of an aerosol, for example, the moisture content of a cloud.

It is another object of my invention to provide improved apparatus to measure the average particle size of the liquid suspended in an aerosol.

It is another object of my invention to provide such apparatus which is adapted to provide an electrical signal suitable for telemetering.

It is another object of my invention to provide such apparatus which is light, compact, reliable, and automatic in operation, so that it is suitable for radio sonde applications.

It is a further object of my invention to provide such apparatus which is adapted for use in sub-freezing temperatures without associated heating means, the additional weight of which would be undesirable for many applications.

The features of my invention which I believe to be novel and patentable are pointed out in the claims appended hereto. For a better understanding of my invention, reference is made in the following description to the accompanying drawing, in which Fig. 1 is a schematic diagram of one form of my invention; Fig. 2 is a fragmentary diagram showing a modification of the apparatus of Fig. 1; Fig. 3 is a schematic diagram of another form of my invention; Fig. 4 is a section along the line 4—4, Fig. 3; Fig. 5 is a schematic diagram of another form of my invention, and Fig. 6 is a schematic diagram of a bridge-type measuring circuit which may be used with my invention.

Referring now to Fig. 1, a passageway 1 is adapted to have the measured aerosol flow therethrough in a direction perpendicular to the section shown. If the apparatus is to be attached to a weather balloon, for example, to measure the moisture content of a cloud, passageway 1 should be positioned to face in the direction of travel of the balloon through the cloud. If the apparatus is used at a ground weather station, a weather vane or equivalent device may be used to keep passageway 1 facing into the wind. In other applications, passageway 1 may be a duct or a pipe through which the aerosol flows. The remainder of the apparatus is shielded from exposure to the aerosol by a case (not shown). A permeable thread 2 extends across the passage-

2 way, preferably perpendicular to the direction of flow of the aerosol, as shown, and is wound upon two spools 3 and 4. Thread 2 may, for example, be ordinary #60 cotton thread which has been previously soaked in a saturated solution of sodium chloride and then dried. The electrical resistivity of this thread will be relatively high when it is dry. For example, a .04 inch length of thread may have an electrical resistance somewhat over one megohm. Upon exposure to moisture, the salt with which the thread is impregnated liquefies, and the electrical resistivity of the thread is greatly lowered; for example, after such exposure a .04 inch length may have a resistance varying between 50,000 ohms and 1 megohm, depending upon the amount of moisture to which the thread has been exposed.

The apparatus is usually operated so that each portion of the thread is exposed to the aerosol for only a short time, as hereinafter explained. Consequently, there is little diffusion of water vapor into the thread, and substantially all wetting of the thread is due to droplets of suspended liquid. When so operated the apparatus measures suspended liquid or moisture content of the aerosol, and not humidity or vapor content.

Although the post-exposure wetness of the permeable element is preferably determined by measuring its electrical resistance, as herein described, it will be appreciated that other electrical characteristics of the permeable element which vary with wetness may be measured.

A spring motor or clockwork 5, or other suitable means, is used to rotate spool 4 so that when the apparatus is in operation thread 2 is unwound from spool 3 and rewound upon spool 4 preferably at a constant rate. A rate of travel of $\frac{1}{16}$ inch per second, corresponding to an effective exposure time of about 4 seconds, gives good results. A tubular shield 6, preferably of a porous material such as porous alumina to prevent "drooling" of condensed moisture from the end of the shield onto the thread, extends part of the way across passageway 1 and shields thread 2 from exposure to the aerosol except for a short interval as the thread passes between the right-hand end of tube 6 and the wall of passageway 1. Preferably, the gap or space between the end of tube 6 and the wall of passageway 1 is about $\frac{3}{16}$ inch in length. As successive portions of dry thread 2 pass through this gap they are exposed to the aerosol, and their electrical resistivity is lowered by the liquid which they collect, as has been previously explained. After such exposure the thread passes over two contacting members 7, preferably spaced about .04 inch apart. It will be understood that the invention is not limited to any particular arrangement of contacting members 7, and that other arrangements will occur to those skilled in the art. The two contacting members may be spaced apart along the thread, as schematically illustrated in the drawing, or they may be spaced on opposite sides of the thread and separated by the thread thickness. Means, such as battery 8 and milliammeter 9, are provided to measure the electrical resistivity of the thread between these contacting members, such measured resistivity being an indication of the amount of liquid suspended in the aerosol. While this method of measuring resistivity most simply illustrates the principle involved, in practice it is desirable in most cases to provide a recording instrument to supply a permanent record of the measured resistivity, or telemetering means to record the resistivity at a distant location, in place of the milliammeter shown. Such apparatus is well known and need not be described further herein.

I have found that apparatus similar to that just described has a response time of about 1 second when entering a cloud and three to four seconds when leaving a cloud. Thus, if such apparatus is used with a weather balloon having an ascent velocity of 200 meters per minute, an indication can be obtained which is accurate within 10 to 40 feet upon entering or leaving a cloud. I have used such apparatus with good results at temperatures approximately 8 degrees below the freezing point of water. During such use the porous alumina shield accumulated a deposit of ice $\frac{1}{16}$ inch thick, but operation of the apparatus was not adversely affected.

A preferred modification of my apparatus uses a permeable thread comprising a small metal wire, preferably about .003 inch to .005 inch in diameter, having one or two layers of cotton covering impregnated with salt as hereinbefore described. Such a modification is shown in Fig. 2. In this case the electrical resistivity of the cotton covering is measured between the wire 2a and a single contacting member 7. Preferably, wire 2a is secured by a screw 10 to spool 4, which may be of metal or other conducting material, and electrical contact is established therewith through a brush or contacting member 7a co-operating with the spool. The resistance of the wire is negligibly small compared to the resistance of the cotton covering; accordingly, the resistance measured between members 7 and 7a is substantially the resistance through the permeable cotton covering. The advantages of this form of my invention are increased sensitivity and a smoother transition observed as the water particles liquefy the dry salt.

Other soluble salts may be used in place of sodium chloride to impregnate the permeable element. In the modification shown in Fig. 2, wire 2a is commonly copper, and it may then be desirable to use a copper salt, such as copper chloride or copper nitrate, as the impregnating agent to avoid the polarizing effect due to battery action which would take place between sodium chloride and the copper wire. Suspended liquids other than water may be measured by my apparatus, but in all cases the permeable element must be permeable to such liquid, and the impregnating salt must be soluble in such liquid and must form a solution having a higher conductivity than the dry salt.

Instead of using a cotton covering on wire 2a, other materials may be used which are permeable and have a high electrical resistivity when dry. For example, a plastic covered wire has proved very satisfactory. Polyvinyl formal, which is commonly used as an insulating covering for wire, is very satisfactory for this purpose if it is not baked. Ordinary insulated wire having a polyvinyl formal coating is baked to make the coating impermeable to water, but when not baked it is sufficiently permeable for use with my apparatus. Another possibility is the use of an oxidized wire, such as a wire having an anodized aluminum coating.

Referring now to Fig. 3, a form of my invention is shown which is adapted to simultaneously measure both the amount of liquid suspended in an aerosol and the average particle size of such liquid. This is done by providing two measuring elements similar to those described above. The aerosol flows through passageway 11 as previously explained, and the moisture content thereof is measured by determining the post-exposure electrical resistivity of permeable element 12, which preferably is a wire of the form shown in Fig. 2. Spools 13 and 14 are adapted to have element 12 wound thereupon; porous alumina shields 15 are adapted to shield all but a small portion of the permeable element from exposure to the aerosol; and terminals 16 and 17, battery 18, and milliammeter 19 are adapted to measure the resistivity of element 12 after exposure. Element 12 is exposed to the aerosol at a point where the flow thereof is substantially unobstructed. A second moisture sensitive element 20 is wound upon spools 21 and 22 and its resistivity, after exposure, is measured by terminals 25 and 26, battery 27 and milliammeter 28. This second element is exposed to the aerosol in the stagnation zone along the front edge of a cylinder 23, which preferably extends across the passageway substantially perpendicular to the direction of flow of the aerosol. Shielding members 24 shield all except a small portion of element 20 from such exposure. Since particles of relatively large size and mass are less readily deflected than smaller particles by curvature of the aerosol flow path around cylinder 23, the collection efficiencies of elements 12 and 20 differ by an amount depending upon the average size of such particles. It is thus possible to calibrate the difference in reading of the two milliammeters 19 and 28 in terms of such average particle size.

The instrument can be calibrated to determine the relation between meter readings and droplet sizes by taking experimental readings with aerosols having known characteristics; or a calibration can be made from theoretical computations using methods described in the following publications: "A Mathematical Investigation of Water Droplet Trajectories," by Langmuir and Blodgett, A. A. F. Technical Report 5418 (1946), copies of which may be obtained from Wright Field; "Basic Icing Research by the General Electric Company," A. A. F. Technical Report 5539 (1946), obtainable from Wright Field; and "Icing Reports of Mt. Washington Observatory," vol. I, No. 5 (1945), and vol. II, No. 5 (1946), obtainable from the Mt. Washington Observatory, 2 Divinity Avenue, Cambridge, Mass.

In Fig. 5 a modification of the above apparatus is shown which requires only one moisture sensitive element. A flat metal ribbon 30 is coated with a permeable, moisture sensitive material as hereinbefore described. One edge of this element is exposed to the aerosol flowing in passageway 29 at a point where such flow is substantially unobstructed, and the element is then twisted one-half turn and the opposite edge is exposed in the stagnation zone in front of cylinder 39. Spools 31 and 32, tubular alumina shields 34, shields 40, electric contacts 35, 36, 41, and 42, batteries 37 and 43, and milliammeters 38 and 44 serve the purposes hereinbefore described. Two small idler wheels 33 support the ribbon and insure that it will be given the proper amount of twist between the two points where it is exposed. Note that contacts 35 and 41 are so positioned that the resistivity of each edge of the permeable element is measured immediately following its exposure to the aerosol.

Referring now to Fig. 6, I have shown a bridge-type measuring circuit adapted to directly compare the electrical resistivities of the permeable element before and after exposure to the aerosol. This type circuit is desirable where the apparatus may be exposed to moisture for relatively long periods of time, so that some moisture may reach the permeable element before it is intentionally exposed. Permeable element 45 is preferably of the covered-wire form illustrated in Fig. 2, and is wound upon metal spool 46 as hereinbefore explained. The aerosol measured flows through passageway 47, of which a fragment only is shown, and element 45 is exposed to the aerosol as it travels between porous alumina shield 48 and the right-hand wall of passageway 47. Contact 49 is positioned to measure the electrical resistance through the permeable coating of element 45 before it is exposed to the aerosol, and contact 50 is positioned to measure such resistance after exposure. Contact 51 cooperates with metal spool 46 to establish electrical connection with the wire of element 45. Battery 52, resistor 53, and milliammeter 54, connected as shown, complete a conventional bridge circuit to compare the two measured resistances. Such a bridge arrangement can also be used to compare the two resistances measured by the apparatus of Figs. 3 and 5.

In accordance with the provisions of the patent statutes, I have described the principle of my invention together with the apparatus which I now consider represents the best embodiment thereof, but I wish it to be understood that the apparatus shown is illustrative only and that the invention may be carried out by other means.

What I claim as new and desire to secure by Letters Patent of the United States is:

1. Apparatus to measure the liquid content of an aerosol comprising a permeable element impregnated with a salt soluble in said liquid and having electrical characteristics which vary as a function of the wetness of said element, shielding means to expose a portion of said element to the aerosol and shield other portions from such exposure, means to move said element relative to said shielding means, so that different portions of said element are exposed successively, and means to measure an electrical characteristic of said portions after such exposure.

2. Apparatus to measure the liquid content of an aerosol comprising a permeable element having a relatively high electrical resistivity when dry and a lower electrical resistivity when wet by said liquid, said element being dry before exposure, shielding means adapted to expose at least one portion of said element to the aerosol and to shield other portions of said element from such exposure, means to move said element relative to said shielding means to change the portions of said element so exposed, and means to measure the electrical resistivity of said portions after such exposure.

3. Apparatus to measure the liquid water content of clouds comprising a permeable element impregnated with a water-soluble salt and having electrical characteristics which vary as a function of the wetness of said element, shielding means adapted to expose at least one portion of said element to the cloud and to shield other portions of said element from such exposure, said element being dry prior to such exposure, means to move said element relative to said shielding means to change the portions of said element so exposed, and means to measure an electrical characteristic of said portions after such exposure.

4. Apparatus to measure the liquid content of an aerosol comprising a permeable thread impregnated with a soluble salt and having a relatively high electrical resistivity when dry, a plurality of spools adapted to have said thread wound thereupon, means to transfer said thread from one such spool to another, shielding means adapted to expose at least one portion of said thread to the aerosol and to shield other portions of said thread from such exposure, said thread being dry prior to such exposure, the portion so exposed changing continuously as the thread is transferred from one spool to another, and means to measure the electrical resistivity of said portions after such exposure.

5. Apparatus to determine the liquid content of an aerosol by measuring the change in electrical resistivity of a permeable thread upon exposure to the aerosol, comprising a plurality of spools adapted to have said thread wound thereon, means to unwind said thread from one such spool and to rewind the thread upon another spool, shielding means adapted to expose at least one portion of said thread to the aerosol and to shield other portions of said thread from such exposure, the portion so exposed changing continuously as the thread is transferred from one spool to another, and means to measure the electrical resistivity of said portions after such exposure.

6. Apparatus comprising a permeable, electrically insulating thread impregnated with a soluble salt, two spools adapted to have said thread wound thereon, means to rotate said spools so that said thread is unwound from one spool and rewound upon the other, shielding means enclosing said thread except for a small space between the two spools so that successive portions of the thread are exposed for a short interval as it travels from one spool to the other and at other times are shielded from such exposure, and means to measure the electrical resistivity of said thread after such exposure.

7. Apparatus to measure the liquid content of an aerosol flowing past said apparatus comprising a permeable, electrically insulating thread impregnated with a soluble salt, two spools adapted to have said thread wound thereon, means to rotate at least one of said spools so that said thread is unwound from one spool and rewound upon the other at a substantially constant rate, shielding means adapted to expose successive portions of the thread to the aerosol for a short interval as the thread travels from one spool to the other and at other times to shield said portions from such exposure, and means including members in electrical contact with said thread to measure the electrical resistivity of said portions immediately after such exposure.

8. Apparatus to measure the liquid content of an aerosol comprising a wire having a permeable coating, said coating having an electrical relatively high resistivity when dry and a lower electrical resistivity when permeated by such liquid, a plurality of spools adapted to have said wire wound thereon, means to transfer said wire from one such spool to another, shielding means adapted to expose at least one portion of said coating to the aerosol and to shield other portions of said coating from such exposure, the portion so exposed changing continuously as the wire is transferred from one spool to another, and means to measure the electrical resistivity of said portions after such exposure.

9. Apparatus to measure the liquid content of an aerosol comprising a wire having a permeable, electrically insulating coating impregnated with a soluble salt, a plurality of spools adapted to have said wire wound thereon, means to rotate at least one of said spools so that said wire is unwound from one spool and rewound upon another at a substantially constant rate, shielding means adapted to expose successive portions of said coating to the aerosol for a short interval as the wire travels from one spool to another and at other times to shield said portions from such exposure, and means including said wire and a member in electrical contact with said coating to measure the electrical resistance through said coating after such exposure.

10. Apparatus to measure the quantity and particle size of a liquid in an aerosol flowing past said apparatus comprising two permeable threads each having electrical characteristics which vary as a function of the wetness of said element when permeated by said liquid, an obstructing member positioned in the flow path of said aerosol, shielding means adapted to expose a portion of one of said threads to the aerosol at a point where the flow thereof is substantially unobstructed and to shield other portions of said thread from such exposure, shielding means adapted to expose a portion of the other of said threads to the aerosol substantially within a stagnation zone in front of said obstructing member and to shield other portions of said thread from such exposure, means to move each of said threads relative to its respective shielding means to change the portions of said threads so exposed, and means to measure an electrical characteristic of said portions of each thread after such exposure, whereby the particle size of liquid suspended in the aerosol can be determined by comparing the measurements with previously prepared calibration data.

11. Apparatus to measure the quantity and average particle size of a liquid in an aerosol flowing past said apparatus comprising two permeable threads impregnated with a salt soluble in said liquid and having a relatively high electrical resistivity when dry, a cylinder positioned in the flow path of said aerosol with its axis substantially perpendicular to the direction of flow, a plurality of spools adapted to have said threads wound thereupon, means to transfer each of said threads from one to another of said spools by unwinding the thread from one spool and rewinding upon another, shielding means adapted to expose successive portions of each thread to the aerosol for a short interval as the thread travels from one spool to another and at other times to shield said portions from such exposure, one of said threads being exposed to the aerosol at a point where the flow thereof is substantially unobstructed and the other of said threads being exposed to the aerosol substantially within the stagnation zone in front of said cylinder, and means to measure the electrical resistivity of said portions of each thread after such exposure, whereby the particle size of liquid suspended in the aerosol can be determined by comparing the measurements with previously prepared calibration data.

12. Apparatus to measure the quantity and average particle size of a liquid in an aerosol flowing past said apparatus comprising two wires, each having a permeable coating, said coatings having a relatively high electrical resistivity when dry and a lower electrical resistivity when permeated by such liquid, a cylinder positioned in the flow path of said aerosol with its axis substantially perpendicular to the direction of flow, a plurality of spools adapted to have said wires wound thereupon, means to transfer each of said wires from one to another of said spools by unwinding the wire from one spool and rewinding upon another, shielding means adapted to expose successive portions of each coating to the aerosol for a short interval as the wire travels from one spool to another and at other times to shield said portions from such exposure, one of said coatings being exposed to the aerosol at a point where the flow thereof is substantially unobstructed and the other of said coatings being exposed to the aerosol substantially within the stagnation zone in front of said cylinder, and means to measure the electrical resistance through each of said coatings after such exposure, whereby the particle size of liquid suspended in the aerosol can be determined by comparing the measurements with previously prepared calibration data.

13. Apparatus to measure the quantity and particle size of a liquid in an aerosol flowing past said apparatus comprising a permeable ribbon having a relatively high electrical resistivity when dry and a lower electrical resistivity when permeated by said liquid, an obstructing member positioned in the flow path of said aerosol, shielding means adapted to expose a portion of one edge of said ribbon to the aerosol at a point where the flow thereof is substantially unobstructed and to expose a portion of the other edge of said ribbon to the aerosol substantially within a stagnation zone in front of said obstructing member and to shield other portions of said ribbon from such exposure, means to move said ribbon relative to the shielding means to change the portions of the ribbon so exposed, and means to measure the electrical resistivity of said portions of each edge of said ribbon after such exposure, whereby the particle size of liquid suspended in the aerosol can be determined by comparing the measurements with previously prepared calibration data.

14. Apparatus to measure the quantity and average particle size of a liquid in an aerosol flowing past said apparatus comprising a metallic ribbon having a permeable coating, said coating having a relatively high electrical resistivity when dry and a lower electrical resistivity when permeated by said liquid, a cylinder positioned in the flow path of said aerosol with its axis substantially perpendicular to the direction of flow, two spools adapted to have said ribbon wound thereon, means to transfer said ribbon from one to the other of said spools by unwinding the ribbon from one spool and rewinding upon the other, shielding means adapted to expose successive portions of each edge of the ribbon to the aerosol for a short interval as the ribbon travels from one spool to the other and at other times to shield said portions from such exposure, one of said edges being exposed to the aerosol at a point where the flow thereof is substantially unobstructed and the other of said edges being exposed to the aerosol substantially within the stagnation zone in front of said cylinder, and means to measure the electrical resistance through said coating at each of said edges after such exposure, whereby the particle size of liquid suspended in the aerosol can be determined by comparing the measurements with previously prepared calibration data.

15. Apparatus to determine the liquid content of an aerosol by measuring the change in electrical resistivity of a permeable element upon exposure to the aerosol, said element having a relatively high electrical resistivity when dry and a lower electrical resistivity when permeated by such liquid, comprising shielding means adapted to expose at least one portion of said element to the aerosol and to shield other portions of said element from such exposure, means to move said element relative to said shielding means to change the portions of said element so exposed, and means to compare the electrical resistivity of said portions before and after such exposure respectively.

16. Apparatus to measure the liquid content of an aerosol comprising a wire having a permeable, electrically insulating coating impregnated with a soluble salt, a plurality of spools adapted to have said wire wound thereon, means to rotate at least one of said spools so that said wire is unwound from one spool and rewound upon another at a substantially constant rate, shielding means adapted to expose successive portions of said coating to the aerosol for a short interval as the wire travels from one spool to another and at other times to shield said portions from such exposure, and means including said wire and a plurality of members in electrical contact with said coating to compare the electrical resistances through said coating before and after such exposure respectively.

VINCENT J. SCHAEFER.

REFERENCES CITED

The following references are of record in the file of this patent:

UNITED STATES PATENTS

| Number | Name | Date |
| --- | --- | --- |
| 2,009,760 | Brown et al. | July 30, 1935 |
| 2,295,570 | Dunmore | Sept. 15, 1942 |
| 2,367,561 | Bouyoucos | Jan. 16, 1945 |